United States Patent
Shellen et al.

(10) Patent No.: US 8,190,997 B2
(45) Date of Patent: May 29, 2012

(54) PERSONALIZED CONTENT FEED SUGGESTIONS PAGE

(75) Inventors: Jason H. Shellen, Pleasanton, CA (US); Mihai Parparita, New York, NY (US)

(73) Assignee: Google Inc., Mountain View, CA (US)

( * ) Notice: Subject to any disclaimer, the term of this patent is extended or adjusted under 35 U.S.C. 154(b) by 565 days.

(21) Appl. No.: 11/246,596

(22) Filed: Oct. 7, 2005

(65) Prior Publication Data
US 2007/0083520 A1    Apr. 12, 2007

(51) Int. Cl.
*G06F 3/048* (2006.01)
*G06F 3/00* (2006.01)

(52) U.S. Cl. ........ 715/733; 715/810; 715/764; 715/723; 715/804

(58) Field of Classification Search .................. 715/733, 715/781, 783, 804; 415/412.1
See application file for complete search history.

(56) References Cited

U.S. PATENT DOCUMENTS

| | | | |
|---|---|---|---|
| 5,872,921 A | 2/1999 | Zahariev et al. | |
| 6,138,147 A | 10/2000 | Weaver et al. | |
| 6,154,752 A | 11/2000 | Ryan | |
| 6,701,350 B1 * | 3/2004 | Mitchell | 709/217 |
| 6,831,667 B1 | 12/2004 | Russin et al. | |
| 7,149,353 B2 * | 12/2006 | Siegel et al. | 382/190 |
| 7,293,019 B2 | 11/2007 | Dumais et al. | |
| 7,360,167 B2 | 4/2008 | Hennum et al. | |
| 7,412,534 B2 * | 8/2008 | Tsang et al. | 709/231 |
| 7,581,166 B2 | 8/2009 | Renger et al. | |
| 7,665,036 B1 | 2/2010 | Lin et al. | |
| 7,770,130 B1 | 8/2010 | Kaptelinin | |
| 7,818,659 B2 | 10/2010 | Kahn et al. | |
| 7,865,830 B2 * | 1/2011 | Kim et al. | 715/713 |
| 2002/0096563 A1 * | 7/2002 | Singhal | 235/382.5 |
| 2002/0165881 A1 | 11/2002 | Shelton | |
| 2003/0050863 A1 * | 3/2003 | Radwin | 705/27 |
| 2003/0097453 A1 | 5/2003 | Fuchigami et al. | |
| 2003/0184583 A1 | 10/2003 | Lim | 345/738 |
| 2004/0189695 A1 | 9/2004 | Kurtz et al. | 345/738 |
| 2004/0204128 A1 * | 10/2004 | Zakharia et al. | 455/566 |
| 2005/0021680 A1 | 1/2005 | Ekis et al. | |
| 2005/0114790 A1 | 5/2005 | Dunbar et al. | |

(Continued)

FOREIGN PATENT DOCUMENTS

CN    1473301 A    2/2004

(Continued)

OTHER PUBLICATIONS

Wikipedia.Com, "List of Feed Aggregators", Mar. 21, 2008.*

(Continued)

*Primary Examiner* — Simon Ke
*Assistant Examiner* — Erik Stitt
(74) *Attorney, Agent, or Firm* — Morgan, Lewis & Bockius LLP (57) ABSTRACT

A user may be presented with suggestions of content feeds to which she may subscribe. The suggestions are based on documents, such as web pages, accessed by the user. The content feeds suggested to the user are content feeds associated with at least some of the documents accessed by the user. The user may accept or reject any or all of the suggestions. A suggestion of a content feed may be suppressed based on a rejection of a past suggestion for the same content feed.

30 Claims, 8 Drawing Sheets

U.S. PATENT DOCUMENTS

| | | | |
|---|---|---|---|
| 2005/0131866 A1* | 6/2005 | Badros et al. ................... 707/3 | |
| 2005/0132067 A1* | 6/2005 | Bennett et al. ............... 709/228 | |
| 2005/0135361 A1 | 6/2005 | Lim et al. | |
| 2005/0216452 A1 | 9/2005 | Teague ............................ 707/3 | |
| 2005/0289468 A1 | 12/2005 | Kahn et al. ................... 715/738 | |
| 2006/0015651 A1 | 1/2006 | Freimuth et al. | |
| 2006/0031335 A1 | 2/2006 | Carey | |
| 2006/0059225 A1 | 3/2006 | Stonehocker et al. | |
| 2006/0073812 A1 | 4/2006 | Punaganti Venkata et al. ........................ 455/412.1 | |
| 2006/0095507 A1 | 5/2006 | Watson | |
| 2006/0129917 A1* | 6/2006 | Volk et al. ..................... 715/513 | |
| 2006/0155698 A1* | 7/2006 | Vayssiere ........................ 707/6 | |
| 2006/0167860 A1* | 7/2006 | Eliashberg et al. ............... 707/3 | |
| 2006/0230021 A1* | 10/2006 | Diab et al. ........................ 707/3 | |
| 2006/0265503 A1* | 11/2006 | Jones et al. ................... 709/227 | |
| 2006/0282822 A1* | 12/2006 | Weng ............................ 717/114 | |
| 2006/0288011 A1* | 12/2006 | Gandhi et al. ................... 707/10 | |
| 2007/0027865 A1 | 2/2007 | Bartz et al. | |
| 2007/0060136 A1* | 3/2007 | Ramer et al. ................... 455/445 | |
| 2007/0061333 A1* | 3/2007 | Ramer et al. ................... 707/10 | |
| 2007/0061711 A1* | 3/2007 | Bodin et al. ................... 715/523 | |
| 2007/0078884 A1* | 4/2007 | Ott et al. ........................ 707/102 | |
| 2007/0100959 A1* | 5/2007 | Eichstaedt et al. ............ 709/217 | |
| 2007/0130589 A1 | 6/2007 | Davis et al. | |
| 2007/0162842 A1 | 7/2007 | Ambachtsheer et al. | |
| 2007/0168522 A1 | 7/2007 | Van Valen, III | |
| 2007/0192318 A1* | 8/2007 | Ramer et al. ..................... 707/7 | |
| 2007/0203906 A1* | 8/2007 | Cone et al. ........................ 707/6 | |
| 2007/0240041 A1 | 10/2007 | Pearson | |
| 2008/0013266 A1* | 1/2008 | Yamada et al. ................ 361/681 | |
| 2008/0117911 A1 | 5/2008 | Rajakarunanayake et al. | |
| 2008/0214155 A1* | 9/2008 | Ramer et al. ................ 455/414.1 | |

FOREIGN PATENT DOCUMENTS

WO    WO 2005/089336 A2    9/2005

OTHER PUBLICATIONS

International Search Report for International Application No. PCT/US2006/039566, mailed Jan. 23, 2007.

Winer, D., "RSS 2.0 Specification," http://blogs.law.havard.edu/tech/rss, Jan. 30, 2005.

Nottingham, N., et al., "The Atom Syndication Format," The Internet Society, http://www.ietf.org/internet-drafts/draft-ietf-atompub-format-11.txt, Aug. 15, 2005.

Daily, G., "Aggregating the Aggregators RSS Reader Round-Up," Econtent, Online, Inc., vol. 28, No. 4, Apr. 2005, pp. 38-40.

Hammersley, B., "Content Syndication with RSS," [Online] Mar. 2003, O'Reilly, USA, URL: http://safari.oreilly.com/0596003838 , [retrieved on Jan. 15, 2007], Chapters 9-10.

International Search Report and Written Opinion for International application No. PCT/US2006/039263, mailed Feb. 26, 2007

International Search Report and Written Opinion for International applichtion No. PCT/US2007/079981, mailed Feb. 20, 2008.

Google, Australian Patent Application 2006302318, Office Action, Mar. 8, 2011, 2 pgs.

Google, Canadian Patent Application 2624868, Office Action, May 10, 2011, 3 pgs.

Google, PCT Application PCT/US06/39566, International Preliminary Report on Patentability, Mar. 25, 2010, 10 pgs.

Anonymous, *RSSOwl Elements: The Main screen*, web.archive.org/web/20060908002519/http://tutorial.rssowl.org/elements.html, retrieved on Sep. 8, 2006, 1 page.

Office Action, Chinese Patent Application 200780044075.8, Sep. 13, 2010, 8 pages.

Supplementary European Search Report, European Patent Application 07843545, Oct. 11, 2010, 4 pages.

"GettingStartedRojo," Nov. 27, 2005, 6 pages, http://web.archive.org/web/20051127084615/rojo.jot.com/GettingStartedRojo.

"Rojo's Frequently Asked Questions (FAQ)," Dec. 2, 2005, 13 pages, http://web.archive.org/web/20051202045411/rojo.jot.com/FAQ.

"Rojo Tour," Aug. 1, 2005, 27 pages, http://web.archive.org/web/20050801014123/rojo.jot.com/RojoTour.

Adachi, Implementation of Bookmark with Categorization and Metadata, Proceedings of 67th National Convention in 2005(3) Database and Media, Network, Japan, Information Processing Society of Japan, Mar. 2, 2005, pp. 3-137 to 3-138.

Google Inc., Office Action, Japanese Patent Application 2008-534740, Dec. 19, 2011, 4 pgs.

Takizawa, An RSS Reader Based on Multiple User's Information, Proceedings of 67th National Convention in 2005(3) Database and Media, Network, Japan, Information Processing Society of Japan, Mar. 2, 2005, pp. 3-197 to 3-198.

\* cited by examiner

PERSONALIZED CONTENT FEED SUGGESTIONS PAGE

RELATED APPLICATIONS

This application is related to the following U.S. Patent Applications, which are incorporated by reference herein in their entirety:

U.S. patent application No. 11/246,596, titled "Content Feed User Interface with Gallery Display of Same-Type Items," filed Oct. 7, 2005;

U.S. patent application No. 11/246,656, titled "Indirect Subscriptions to Top N Lists of Content Feeds," filed Oct. 7, 2005; and U.S. patent application No. 11/246 597, titled "Indirect Subscriptions to a User's Selected Content Feed Items," filed Oct. 7, 2005.

TECHNICAL FIELD

The disclosed embodiments relate generally to content syndication, and more particularly, to providing suggestions of content feed subscriptions based on accessed web pages.

BACKGROUND

Content syndication is growing in popularity as a way to distribute frequently updated information, such as news and blog postings, on the Internet. Using content syndication formats such as Really Simple Syndication (RSS) and Atom, content providers can include content and/or links to such in a content feed. Users may subscribe to these content feeds using an application known as a reader or aggregator. When the content feed is updated with new content items, the new content items are reflected in the user's reader.

Many web pages, such as news web sites and blogs, provide content feeds. However, the content feed links provided by web pages may go unnoticed by the users who browse those pages. Even if the user is interested in subscribing to content feeds provided by the web pages, she may not be able to do so because she may be unaware that they are available.

Accordingly, there is a need for a more efficient manner of subscribing a user to content feeds.

SUMMARY

In accordance with some embodiments, a method of providing content includes identifying a document; determining if the document has an associated content feed; and if the document is determined to have an associated content feed, providing a suggestion to a user to subscribe to the content feed.

In accordance with some embodiments, a method of providing content includes identifying a plurality of documents; identifying a subset of the plurality of documents that have associated content feeds; and providing suggestions to a user to subscribe to at least a subset of the content feeds.

In accordance with some embodiments, a method of subscribing to content includes receiving and presenting to a user a set of content subscription suggestions, including a plurality of content subscription suggestions associated with web pages visited by the user; and subscribing to content feeds corresponding to one or more selections by the user from the set of content subscription suggestions.

BRIEF DESCRIPTION OF THE DRAWINGS

Like reference numerals refer to corresponding parts throughout the drawings.

DESCRIPTION OF EMBODIMENTS

A user, during a web browsing session, may browse web pages that are associated with content feeds. However, the user may not notice those content feeds as she is browsing the web pages and thus lose an opportunity to subscribe to those content feeds. Suggestions to subscribe to content feeds associated with web pages or other documents accessed by the user may be provided to the user, so that she may be informed of those feeds and be given an opportunity to affirmatively subscribe to any or all of those feeds or decline to subscribe to those feeds.

Figure 1:
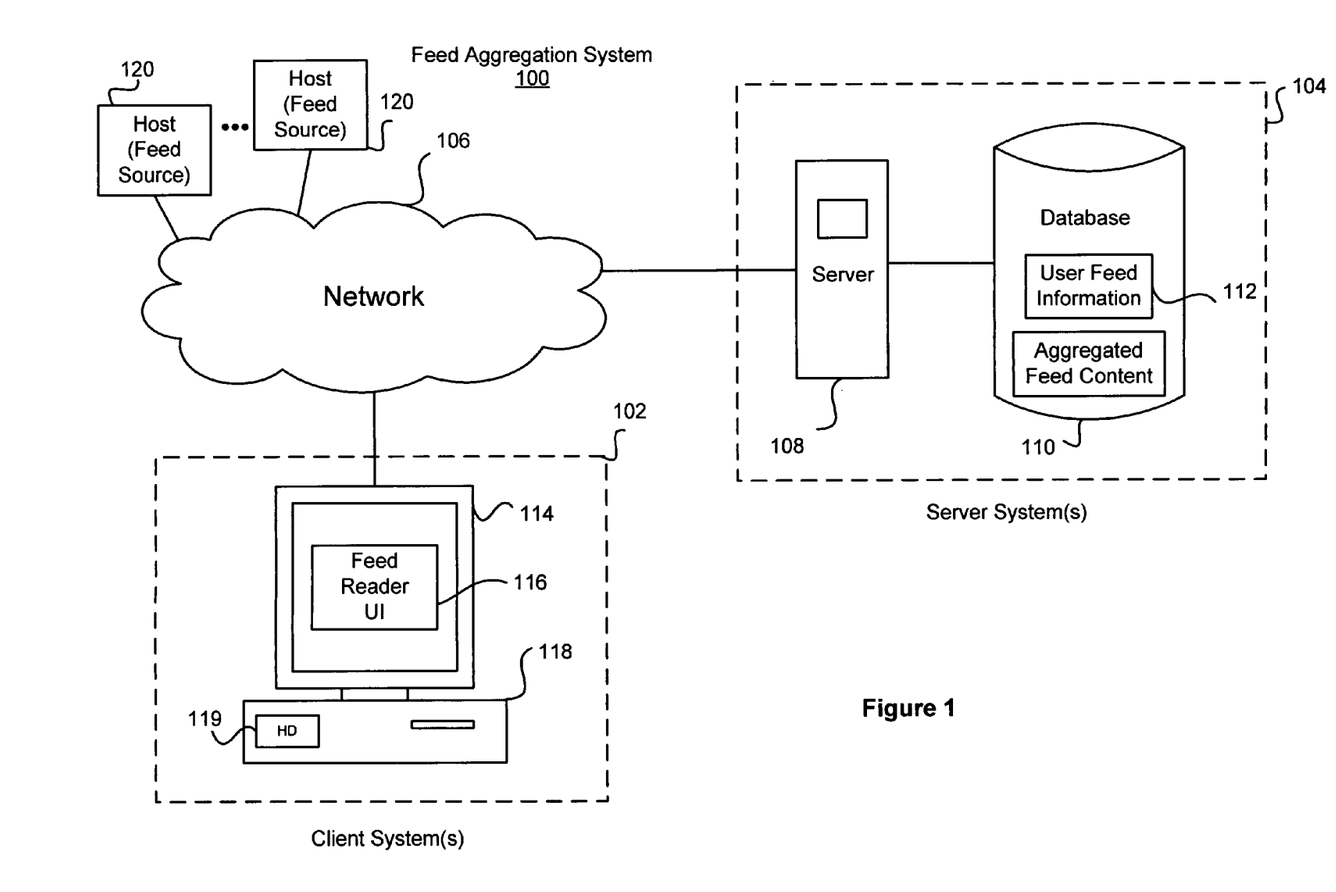
FIG. 1 is a block diagram illustrating a content feed aggregation system in accordance with some embodiments.

FIG. 1 is a block diagram illustrating a content feed aggregation system in accordance with some embodiments. The content feed aggregation system 100 includes a server system 104. The server system 104 is coupled to one or more client systems 102 and to one or more hosts 120 (or "feed sources") by a network 106. The network 106 may be any suitable wired and/or wireless network and may include a local area network (LAN), wide area network (WAN), the Internet, and so forth.

The server system 104 accesses content feeds from the feed sources 120. The server system 104 includes a server 108 and a database 110. Server 108 serves as a front-end for the server system 104. Server 108 retrieves the content feeds from the feed sources 120, and also provides an interface between the server system 104 and the client systems 102. In some embodiments, the functions of server 108 may be divided or allocated among two or more servers.

The server system 104 stores content items in the content feeds in the database 110. In some embodiments, the database 110 stores both metadata (e.g., title, description, URL, date/time, and possibly other metadata) and the content of each content item. However, in some other embodiments, the database 110 stores the metadata but not the content for each content item. The database 110 also stores user feed information 112 for a plurality of users. The user feed information for a particular user identifies content feed subscriptions, as well as sources, filters, and read states for that particular user. That is, user feed information associated with a user identifies the content feeds to which the user has subscribed, any filters the user has defined for the feeds, any labels the user has associated with individual feed items, and an indication of whether each feed item has been marked as "read" by the user.

It should be appreciated that the server system 104, including the server 108 and the database 110, may be implemented as a distributed system of multiple computers. However, for convenience of explanation, the server system 104 is described below as being implemented on a single computer, which can be considered a single logical system.

A content feed (or channel) is a resource or service that provides a list of content items that are present, recently added, or recently updated at a feed source 120. A content item in a content feed may include the content associated with the item itself (the actual content that the content item specifies), a title and/or a description of the content, a locator (e.g., URL) of the content, or any combination thereof. For example, if the content item identifies a text article, the content item may include the article itself inline, along with the title and locator. Alternatively, a content item may include the title, description and locator, but not the article content. Thus, some content items may include the content associated with those items, while others contain links to the associated content but not the full content of the items. A content item may also include additional metadata that provides additional information about the content. The full version of the content may be any machine-readable data, including but not limited to web pages, images, digital audio, digital video, Portable Document Format (PDF) documents, and so forth.

In some embodiments, a content feed is specified using a content syndication format, such as RSS. RSS is an acronym that stands for "rich site summary," "RDF site summary," or "Really Simple Syndication." "RSS" may refer to any of a family of formats based on the Extensible Markup Language (XML) for specifying a content feed and content items included in the feed. In some other embodiments, other content syndication formats, such as the Atom syndication format, the VCALENDAR calendar format, or any of a number of other syndication formats, may be used to specify content feeds.

Further information regarding the RSS syndication format known as "Really Simple Syndication" is disclosed in the RSS 2.0 Specification by D. Winer, which is hereby incorporated by reference herein in its entirety. M. Nottingham et al. disclose further information regarding the Atom syndication format in The Atom Syndication Format, which is hereby incorporated by reference herein in its entirety.

A user interfaces with the server system 104 and views content items at a client system or device 102 (hereinafter called the client system for ease of reference). The client system 102 includes a computer 118 or computer controlled device, such as a person digital assistant, cellular telephone or the like (hereinafter called the client system for ease of reference). The computer 118 typically includes one or more processors (not shown); memory, which may include volatile memory (not shown) and non-volatile memory such as a hard disk drive 119; and a display 114. The computer 118 may also have input devices such as a keyboard and a mouse (not shown).

In some embodiments, a user may interact with the server system 104 via a feed reader user interface 116 that may be presented on the display 114. The user may create a list of feed subscriptions via the feed reader user interface 116. In some embodiments, using the feed reader user interface 116, the user may also create filters or labels to be applied to content feeds and/or content items, and modify the read states of content feeds and/or content items. The feed reader user interface transmits a list of content feed subscriptions, or modifications to a list of content feed subscriptions, to the server system 104 for storage at the database 110. The feed reader user interface 116 presents content items stored at the database 110 to the user based on the user's list of content feed subscriptions. That is, feed reader user interface 116 presents to the user content items specified in the content feeds to which the user has subscribed. A user may view the full version of the content of a content item in the feed reader user interface 116 by selecting it (e.g., by clicking on it with a mouse pointer). In some embodiments, a copy of the user's list of content feed subscriptions and copies of the presented content items may be cached locally at the client system 102.

In some embodiments, the feed reader user interface 116 may be a web-based user interface. That is, the feed reader user interface 116 displays one or more web pages in one or more browser (e.g., web browser) windows. The web pages may be written in the Hypertext Markup Language (HTML), Extensible Markup Language (XML), or any other suitable language for preparing web pages, and may include one or more scripts for interfacing with the server system 104. The user may subscribe to content feeds, view content items, and otherwise interact with the server system 104 by interacting with the web pages of the feed reader user interface 116. In other words, the server system 104, and the web pages transmitted by the server system 104 to the feed reader user interface 116, provides a web-based content aggregation service. The server system 104 aggregates and stores content items in accordance with the user's content feed subscriptions. In some embodiments, the server system 104 can also apply filters or labels, or change the read states of content items in accordance with user actions or instructions. When the user accesses the feed reader user interface 116, content items to which the user has subscribed are presented to the user via the feed reader user interface 116.

In some other embodiments, the feed reader user interface 116 may be a part of a standalone application that is run on the client system 102. The standalone application may interface with the servers system 104 via an application programming interface (API).

Figure 2:
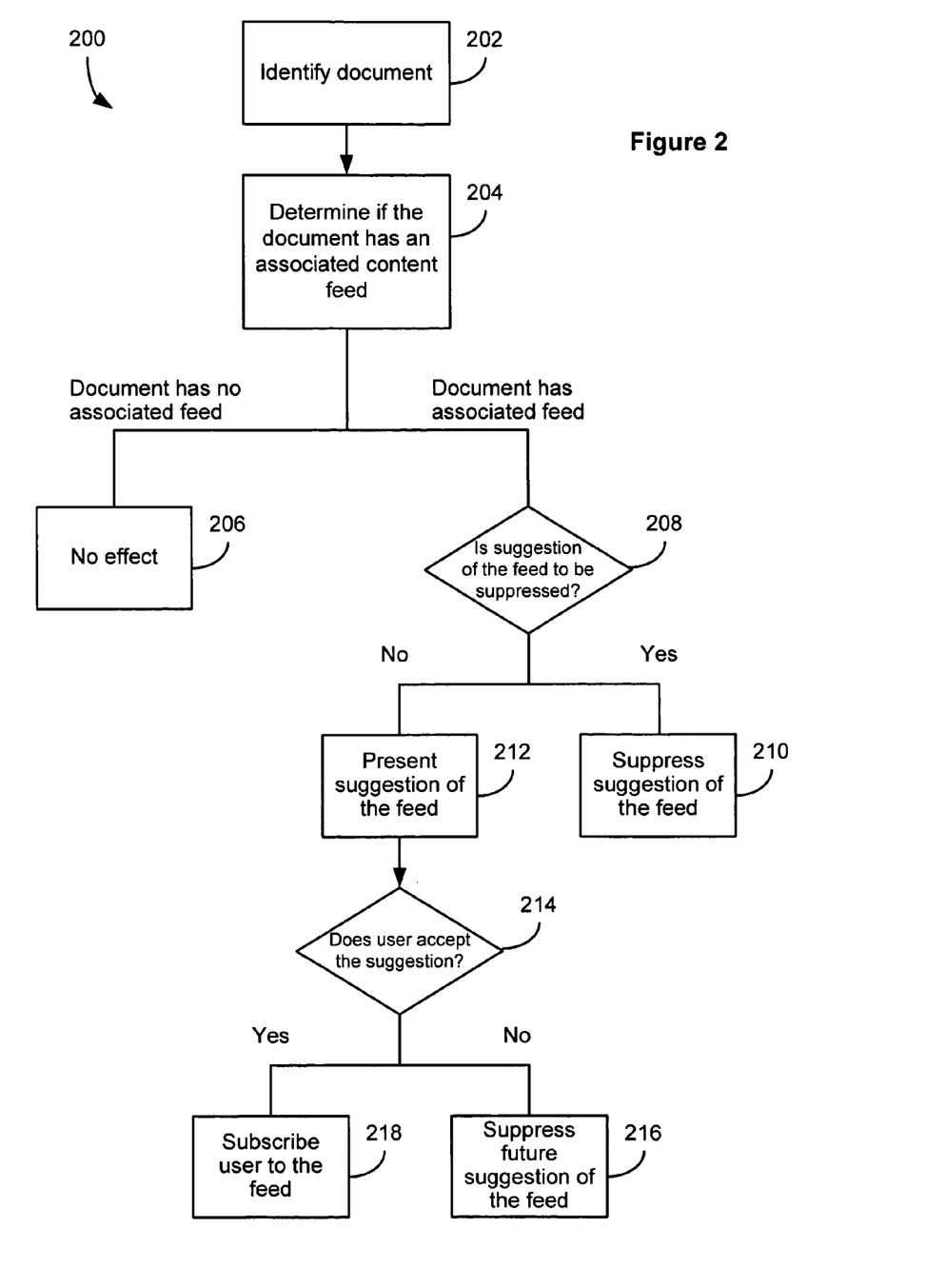
FIG. 2 is a flow diagram illustrating a process for providing content feed subscription suggestions, in accordance with some embodiments.

Attention is now directed to FIG. 2, which is a flow diagram illustrating a process for providing content feed subscription suggestions, in accordance with some embodiments. The content feed aggregation system may identify documents that have associated content feeds and provide to a user a suggestion to subscribe to that content feed. While the process flow 200 described below includes a number of steps or operations that appear to occur in a specific order, it should be apparent that these processes can include more or fewer steps or operations. Some of the operations that are described here as being executed serially may be performed in parallel (e.g., using parallel processors or a multi-threading environment). Furthermore, in some embodiments, some of the operations (e.g., operations 202-210) may be performed multiple times before a following operation (e.g., operation 212) is performed.

A document is identified (202). In some embodiments, the document is a web page visited by the user (e.g., viewed in a web browser on a client system) and the web page is identified at the time of the visit. The web page may be written in the Hypertext Markup Language (HTML), Extensible Markup Language (XML), or any other suitable language for preparing web pages, and may include one or more scripts for interfacing with the server system 104. The web page may be a weblog (also known as a "blog"), a news web page, an image collection web page, or any other type of web page. In some other embodiments, the identified document is any document accessed by the user.

Whether or not the identified document has an associated content feed is determined (204). In some embodiments, the determination is made by searching for the locator of a content feed (in some embodiments, the Uniform Resource Locator (URL)) that is known to be referenced by the identified document in the server system database 110. In some other embodiments, the determination is made by parsing the identified document to locate HTML tags that have attributes associated with a content feed. For example, web pages that include RSS content feeds may include the HTML <LINK> tag with attributes rel="alternate" and type="application/rss+xml" in its HTML source. The <LINK> tag also includes an absolute or a relative locator (in some embodiments, the Uniform Resource Locator (URL)) of the content feed. By searching the document for one or more <LINK> tags having attributes associated with a content feed, a determination on whether the document has an associated content feed may be made. More generally, the identified document may be parsed for any information that indicates the existence of a content feed associated with the document. Examples of such information may include a particular HTML tag with particular attributes, anchor text with particular keywords, etc.

In some embodiments, a record of the document identification may be stored or updated in the server system database 110, if the document is determined to have an associated content feed. Similarly, a record of the document identification associated with the user may be made if the identified document is determined to have an associated content feed. The identified document and the content feed are recorded, as well as the date and time of the access. The record may also include other data. Further details regarding the record are described below, in relation to FIG. 9A.

If the identified document is determined to not have an associated content feed, then there is no effect (206). If the identified document is determined to have an associated content feed, then the content feed may be a candidate for a subscription suggestion to the user. However, in some embodiments, a subscription suggestion may be suppressed (i.e., not presented to the user) for a variety of reasons. One reason for suppressing the suggestion may be that the user already has an active subscription to the content feed; a suggestion to subscribe to the content feed when the user is already subscribed to the feed would be redundant. Another possible reason for suppression may be that the user has previously rejected a suggestion to subscribe to the same content feed. That is, the user did not subscribe to the content feed when the content feed was suggested to the user in the past, implying that the user is not interested in subscribing to that content feed. Other reasons for suppressing a suggestion may also apply, including the application or rules or filters established by the user or by another person or entity. If the subscription suggestion for the content feed is to be suppressed (208-Yes), then the suggestion is suppressed and not presented to the user (210). If the suggestion is not to be suppressed (208-No), then the suggestion is presented to the user (212). In some embodiments, the suggestion may be presented to the user as a prompt (e.g., in a pop-up window) to subscribe to the content feed. The suggestion is an opt-in operation, where the user is not subscribed to the content feed unless the user accepts the suggestion by affirmatively subscribing to the content feed, rather than an opt-out operation.

The user may accept the suggestion, or the user may reject the suggestion. If the user rejects the suggestion (i.e., the user does not opt in to a subscription to the content feed) (214-No), then the user is not subscribed to the suggested content feed. By not accepting the suggestion to subscribe to the suggested content feed, the user may be considered to have rejected the suggestion and future suggestions of the content feed may be suppressed based on that rejection (216). If the user accepts the suggestion (214-Yes), then the user is subscribed to the suggested content feed (218).

As described above, a suggestion to subscribe to a content feed may be suppressed on the basis of a past rejection of a suggestion to subscribe to the same content feed. In some embodiments, a single rejection of the suggestion to subscribe to the content feed may be the basis for suppressing future suggestions to subscribe to the same content feed. In some other embodiments, however, multiple rejections of suggestions to subscribe to the content feed are required in order to suppress future suggestions to subscribe to that content feed. For example, further suggestions to subscribe to a content feed would not be suppressed until the user has rejected suggestions to subscribe to that same content feed two times, three times, or more. (depending on the implementation).

As described above, a suggestion to subscribe to a content feed may be suppressed on the basis of an active subscription to the same content feed. In some embodiments, a determination of whether a subscription to the content feed is active may be made by searching for the content feed in the user's list of content feed subscriptions. In some other embodiments, the determination may be made by searching a feed subscription information table (such as the one described below in relation to FIG. 9B) for the suggested content feed and identifying whether the user is indicated as having subscribed to the content feed (e.g., by checking the subscription flag 956 (FIG. 9B) associated with the user).

In some embodiments, suppression of a content feed subscription suggestion based on one or more rejections of past suggestions may last for at least a predefined duration. The duration of the suppression may be defined by time (e.g., a predefined time elapsed since the start of the suppression) or by the number of times a document with the same content feed was accessed and identified (e.g., a predefined number of times the document has been accessed and identified since the start of the suppression). After the expiration of the duration, the suppression may be rescinded and suggestions for the content feed may be presented to the user, with the possibility that it may be suppressed again in the future. On the other hand, suppression of a content feed subscription suggestion based on an active subscription may last for as long as the subscription remains active.

Figure 3:
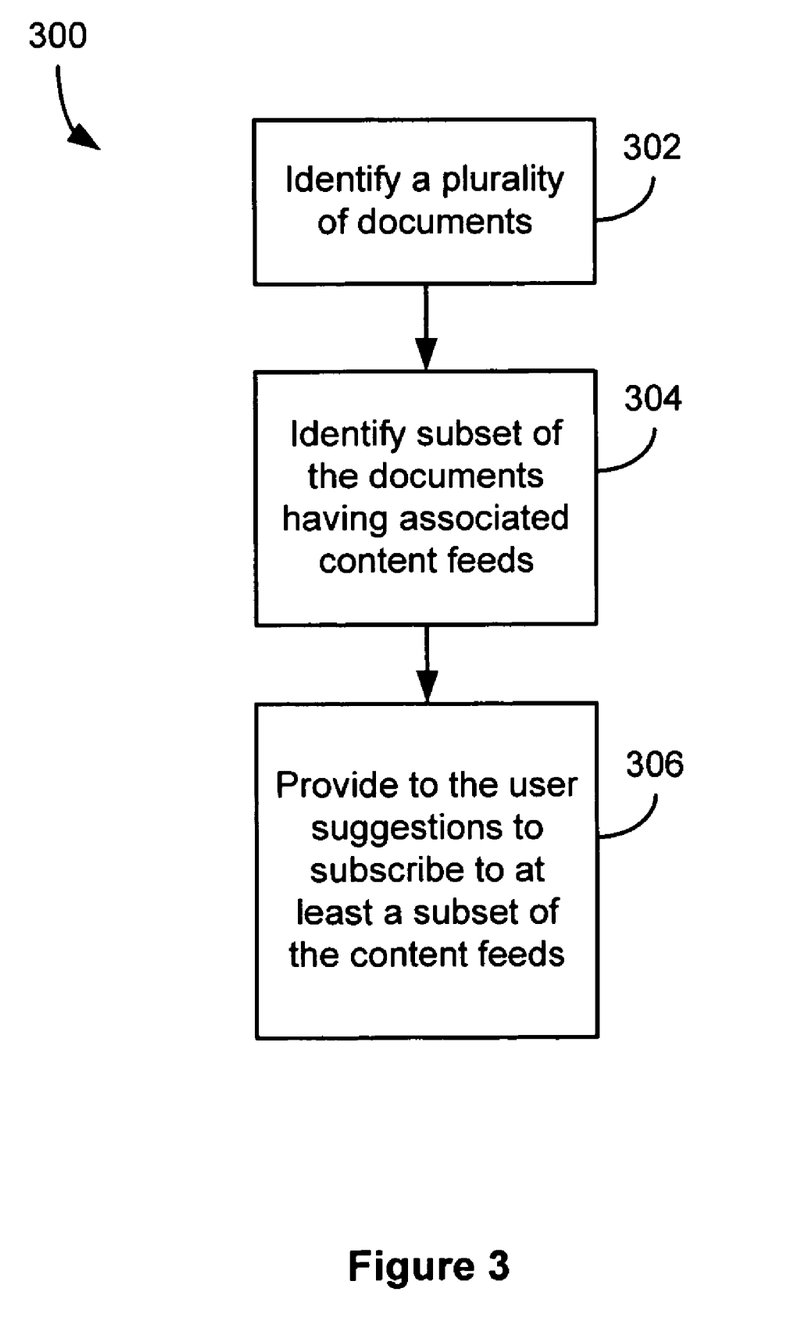
FIG. 3 is a flow diagram illustrating a process for providing content feed subscription suggestions in batches, in accordance with some embodiments.

Attention is now directed to FIG. 3, which is a flow diagram illustrating a process 300 for providing content feed subscription suggestions in batches, in accordance with some embodiments. Multiple suggestions may be presented at once as a batch, rather than one at time, so that the user is less frequently interrupted by prompts to act on a suggestion. A plurality of documents is identified (302). In some embodiments, the documents are web pages visited by the user. A subset of the documents that have associated content feeds is identified (304). In some embodiments, the documents in the subset are the web pages visited by the user that also have associated content feeds. Whether a web page has an associated content feed or not may be determined by parsing the web page or by any other suitable procedure, as described above in relation to FIG. 2. Suggestions to subscribe to at least a subset of the associated content feeds are provided to the user (306). The suggestions may be provided in a suggestions page, where suggestions to subscribe to one or more content feeds may be presented all together and the user may select any, all, or none of the content feeds for subscription. Suggestions for subscriptions to some of the associated content feeds may be suppressed from being presented in the suggestions page based on a current subscription, prior rejections, and/or the application of one or more rules or filters, as described above.

In some embodiments, the suggestion operation 306 is triggered by the user logging on to the content aggregation service. That is, the user is presented with the suggestion when log-on is successful. The suggestions presented are for content feeds associated with documents identified since the last log-on (when suggestions were last presented to the user). After the presentation of the suggestions, the system accumulates suggestions for presentation to the user at the next log-on.

Figure 4:
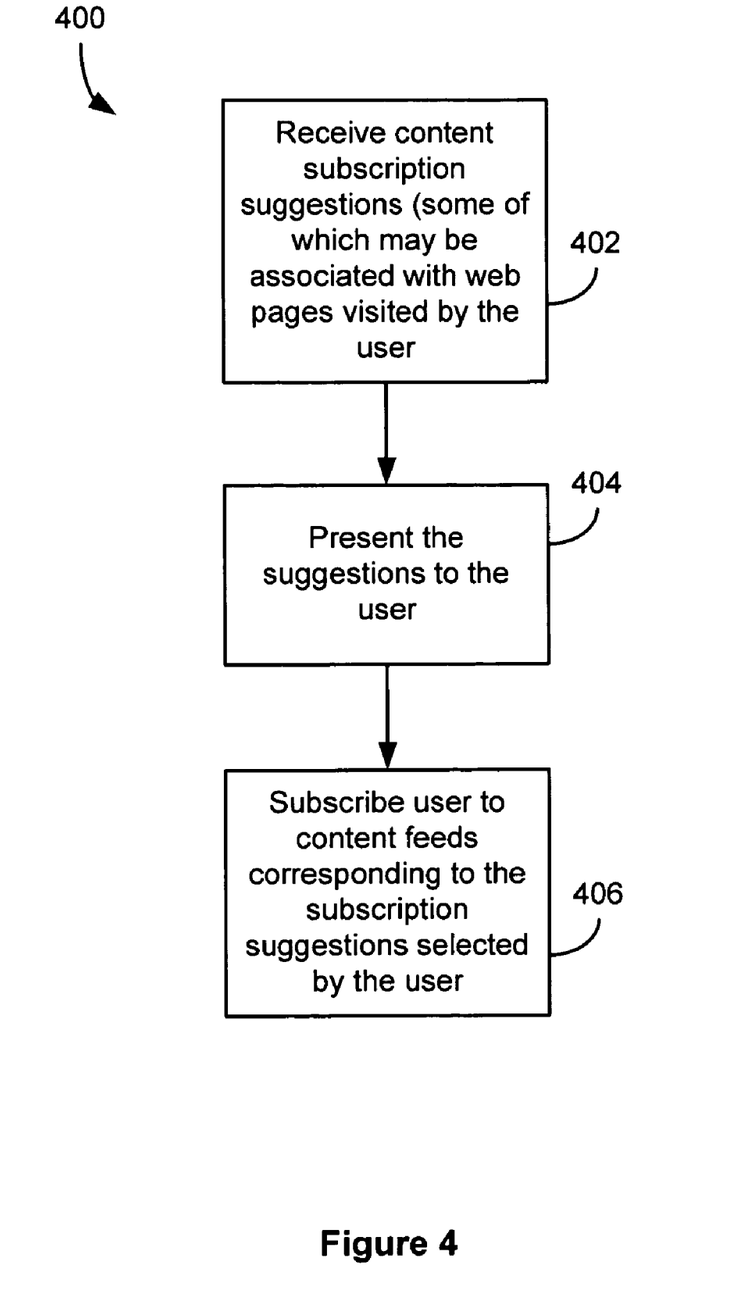
FIG. 4 is a flow diagram illustrating a process for presenting to a user content feed subscription suggestions, in accordance with some embodiments.

Attention is now directed to FIG. 4, which is a flow diagram illustrating a process 400 for presenting to a user content feed subscription suggestions, in accordance with some embodiments. A set of content subscription suggestions are received at the client system 102 (FIG. 1) (402). The set includes a number of content subscription suggestions that are associated with web pages visited by the user. The suggestions are presented to the user (404). As described above, the suggestions may be presented in a prompt (e.g., a pop-up window) or a selection page, where the user can select content feeds for subscription and confirm the subscriptions. The user is subscribed to content feeds corresponding to the user's selections from the subscription suggestions (406). Stated another way, the user is subscribed to the suggested content feeds that she selects for subscription. Content subscription suggestions not selected by the user may be suppressed in the future, as described above.

Figure 5:
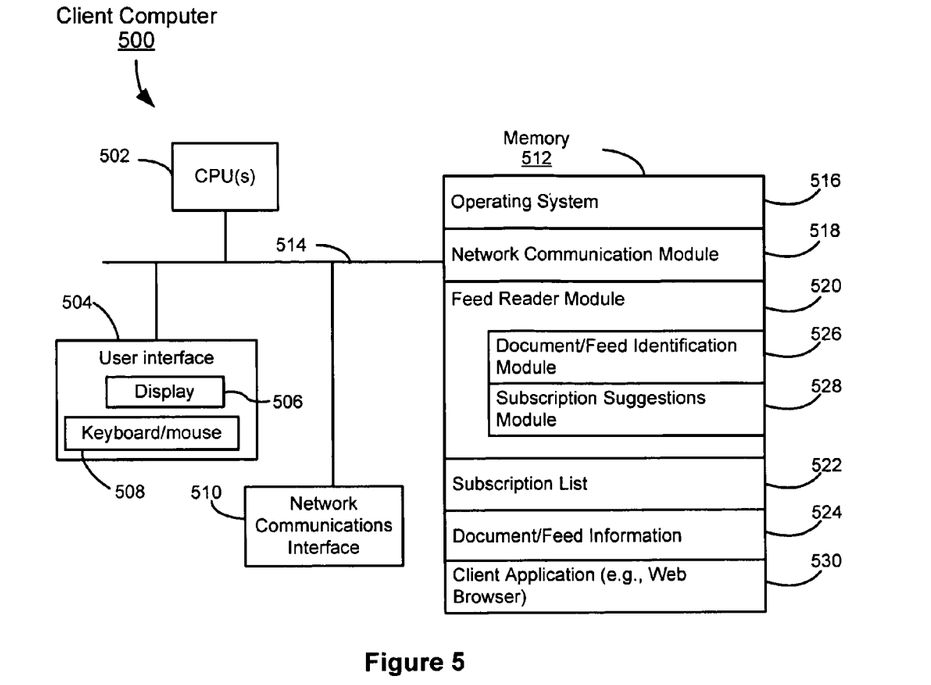
FIG. 5 is a block diagram illustrating a client computer in accordance with some embodiments.

FIG. 5 is a block diagram illustrating a client computer in accordance with some embodiments. The client computer 500 typically includes one or more processing units (CPU's) 502, one or more network or other communications interfaces 510, memory 512, and one or more communication buses 514 for interconnecting these components. The client computer 500 may also include a user interface 504 comprising a display device 506 and a keyboard and/or mouse (or some other pointing device) 508. Memory 512 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 512 may optionally include one or more storage devices remotely located from the CPU(s) 502. Memory 512, or alternatively one or more storage devices (e.g., one or more nonvolatile storage devices) within memory 512, includes a computer readable storage medium. In some embodiments, memory 512 stores the following programs, modules and data structures, or a subset thereof:

- an operating system 516 that includes procedures for handling various basic system services and for performing hardware dependent tasks;
- a network communication module 518 that is used for connecting the client system 500 to other computers via the one or more communication network interfaces 510 and one or more communication networks, such as the Internet, other wide area networks, local area networks, metropolitan area networks, and so on;
- a feed reader module 520 for managing content feed subscriptions and handling content items from content feeds; and
- an application program 530, such as a web browser.

Memory 512 may optionally further store:
- a subscription list 522 for recording a user's current content feed subscriptions; and
- document/feed information 524 for recording documents accessed by the user (such as visited web pages) and any content feeds associated with them.

The feed reader module 520 includes a document/feed identification module 526 for identifying documents accessed by the user (such as visited web pages) and any content feeds associated with them. The feed reader module 520 also includes a subscription suggestions module 528 that provides the user content feed subscription suggestions.

In some embodiments, the document/feed identification module 526 is independent of the feed reader module 520. That is, the document/feed identification module 526 is separate from the feed reader module 526 and may be active even when the feed reader module 520 is not active. That said, the document/feed identification module 526 may communicate with the feed reader module 520. In some embodiments, the document/feed identification module 526 may be a module in a client application, an add-on or plug-in to a client application, or a module in an add-on or plug-in (such as a web browser toolbar) to a client application.

In some embodiments, the feed reader module 520 may be a script-based module, embedded in a web page served from the server system 104 (FIG. 1). The web page may be rendered by a client application 530, such as a web browser, at the client computer 500. When the web page is rendered, the feed reader module 520 is run and rendered as a web-based interface to the server system 104. The script-based feed reader module may be written in JavaScript, ECMAScript or any other suitable scripting language.

In some other embodiments, the feed reader module 520 may be a standalone application stored in memory 512 of the client computer 500. The standalone application may include, but is not limited to a feed aggregator application. In further other embodiments, the feed reader module 520 may be an add-on or a plug-in to another application. For, example, the feed reader module 520 may be a plug-in to a web browser application or an email application.

In some embodiments, received content items may be cached locally in memory 512. Similarly, a user's list of content feed subscriptions may also be cached locally in memory 512.

Figure 6:
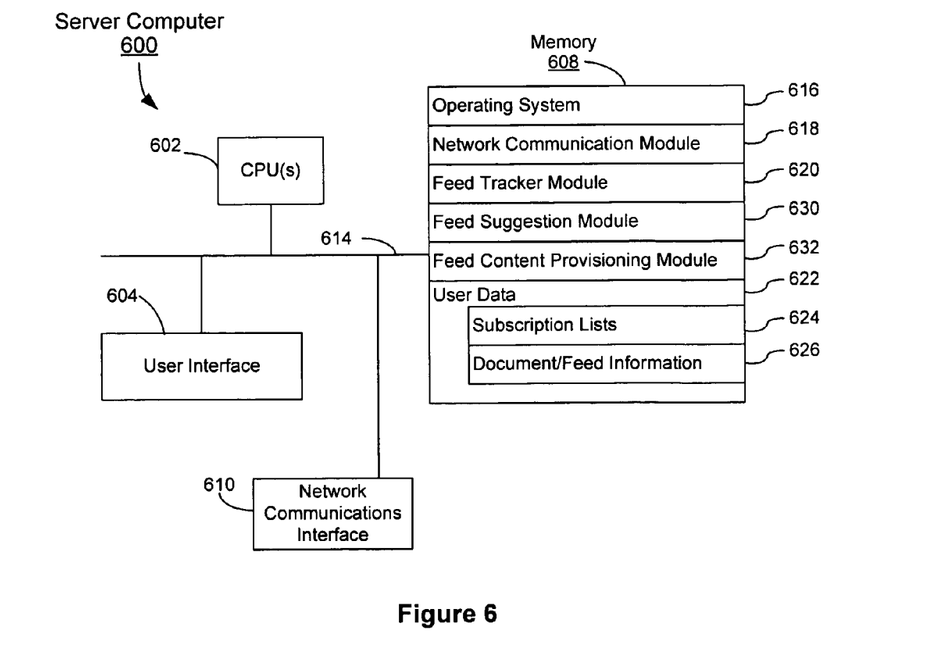
FIG. 6 is a block diagram illustrating a server computer in accordance with some embodiments.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 512 may store a subset of the modules and data structures identified above. Furthermore FIG. 6 is a block diagram illustrating a server computer in accordance with some embodiments. The server computer 600 typically includes one or more processing units (CPU's) 602, one or more network or other communications interfaces 610, memory 608, and one or more communication buses 614 for interconnecting these components. The server system 600 optionally may include a user interface 604, which may include a display device (not shown) and a keyboard and/or a mouse (not shown). Memory 608 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 608 may optionally include one or more storage devices remotely located from the CPU(s) 602. Memory 608, or alternatively one or more storage devices (e.g., one or more nonvolatile storage devices) within memory 608, includes a computer readable storage medium. In some embodiments, memory 608 stores the following programs, modules and data structures, or a subset thereof:

- an operating system 616 that includes procedures for handling various basic system services and for performing hardware dependent tasks;
- a network communication module 618 that is used for connecting the server system 600 to other computers via the one or more communication network interfaces 610 and one or more communication networks, such as the Internet, other wide area networks, local area networks, metropolitan area networks, and so on;
- a feed tracker module 620 for retrieving content items for storage periodically and/or as content feeds are updated; and
- a feed subscription suggestion module 630, for generating content subscription suggestions for users of the service;
- a feed content provisioning module 632, for identifying and sending to users content items from the feeds to which they have subscribed; and
- user data 622, which includes data for each user of the service.

The user data 622 stores data for users of the service, such as login information and user preferences. The user data 622 includes subscription lists 624, which include lists of users' feed subscriptions. Each user has a corresponding list of content feed subscriptions. Each user may also have a list of suggested subscriptions declined by the user. The user data may further include document/feed information 626 for recording documents accessed by the user (such as visited web pages) and any content feeds associated with them.

The subscription suggestion module 630 generates content subscription suggestions for a user of the service by inspecting the user data of the user to identify feed subscriptions that are associated with web pages or documents visited by the user, removing any identified feed subscriptions that are to be suppressed (as discussed above), and sending the user one or more feed suggestions. The one or more feed suggestions may be sent to the user in form of a web page, for presentation to the user using a web browser, or in any other form suitable for use by a client application. The subscription suggestion module 630 may update the user data 622 to identify the user's newly selected subscriptions, and may also update the user data 622 to identify feed subscription suggestions that have been declined by the user.

The feed content provisioning module 632 identifies and sends content items to a user in accordance with the user's feed subscriptions. The feed content provisioning module 632 may update the user data 622 to identify content items viewed by the user, so as to avoid sending those same items to the user again. Optionally, for instance in accordance with service features selected by the user, the feed content provisioning module 632 may also update the user data 622 to record other information, such as information identifying content items bookmarked by the user or otherwise marked or selected by the user as being of special interest to the user.

In some embodiments, the server computer 600 may further store feed subscription information and feed content items in one or more tables (both not shown). The feed subscription information table stores information associated with content feeds, such as the locations of the feeds (e.g., the feeds' URLs) and per-user subscription information with respect to individual content feeds. The feed content items table stores the content items, associated information, and per-user information with respect to individual content items. Further details regarding the feed subscription information and feed content item tables are described below, in relation to FIGS. 9B and 9C.

Each of the above identified elements may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 608 may store a subset of the modules and data structures identified above. Furthermore, memory 608 may store additional modules and data structures not described above.

Although FIG. 6 shows a "server computer," FIG. 6 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 6 could be implemented on single servers and single items could be implemented by one or more servers.

Figure 7:
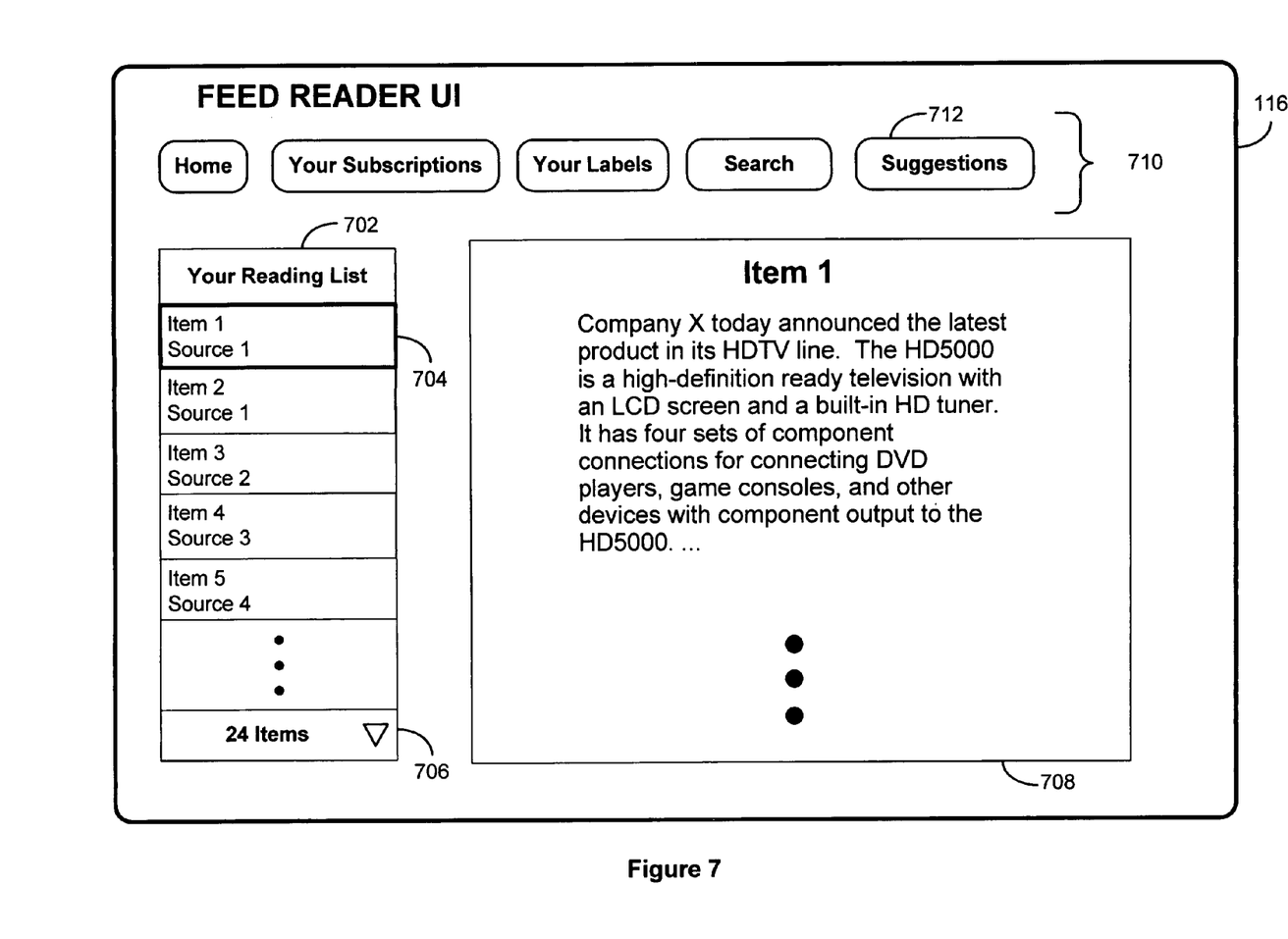
FIG. 7 is a diagram illustrating a feed reader user interface in accordance with some embodiments.

FIG. 7 is a diagram illustrating a feed reader user interface with a "universal view" in accordance with some embodiments. The user, via the feed reader user interface 116, may view, among other things, content items from her subscribed content feeds. The feed reader user interface 116 (hereinafter the "UI") includes one or more buttons, menus, links, and the like 710 for activating and deactivating various functions and features.

The user may view the content items in a "universal view." The universal view includes a list 702 of content items from all of the user's subscribed feeds that have new content items not yet viewed by the user. The list 702 may be generated, for example, by the feed content provisioning module 632 of the server computer 600. In some embodiments, various criteria may be used (by the feed content provisioning module 632) to limit the items included in the list 702, such as publication date and time, and number of items not yet viewed by the user that were published by the same source. For instance, items published more than X (e.g., 7) days ago, may be excluded. In another example, when there are more than Y (e.g., 10) unviewed items from the same source, only the Y most recent unviewed items from the source may be included in the list 702.

The content items 704 shown in the list 702 are interleaved without regard to source. In some embodiments, the list is sorted by publication date and time, for example in reverse chronological order. Also, in some embodiments, the list may show only content items that the user has not viewed. The list presents identifying information for the content items, so that the user can identify a content item she wishes to view and select it. Because the UI 116 may have a finite size and the list may include more items than can fit into the UI, the UI 116 may display a subset of the content items at a given time and the user may scroll through the list to find other content items. The list may also include an indicator 706 of how many content items are in the list in total. Alternatively, the indicator 706 may indicate the number of content items yet to be viewed.

From the list, the user may select a content item. When the user selects an item from the list in the universal view, the UI 116 may display the full version of the content in a viewer region 708. For example, if the selected content item (indicated by a box with a thick border) includes a link to an article at a news web site or a link to a blog posting, the article or the blog posting, respectively, may be displayed in the viewer region 708.

Figure 8:
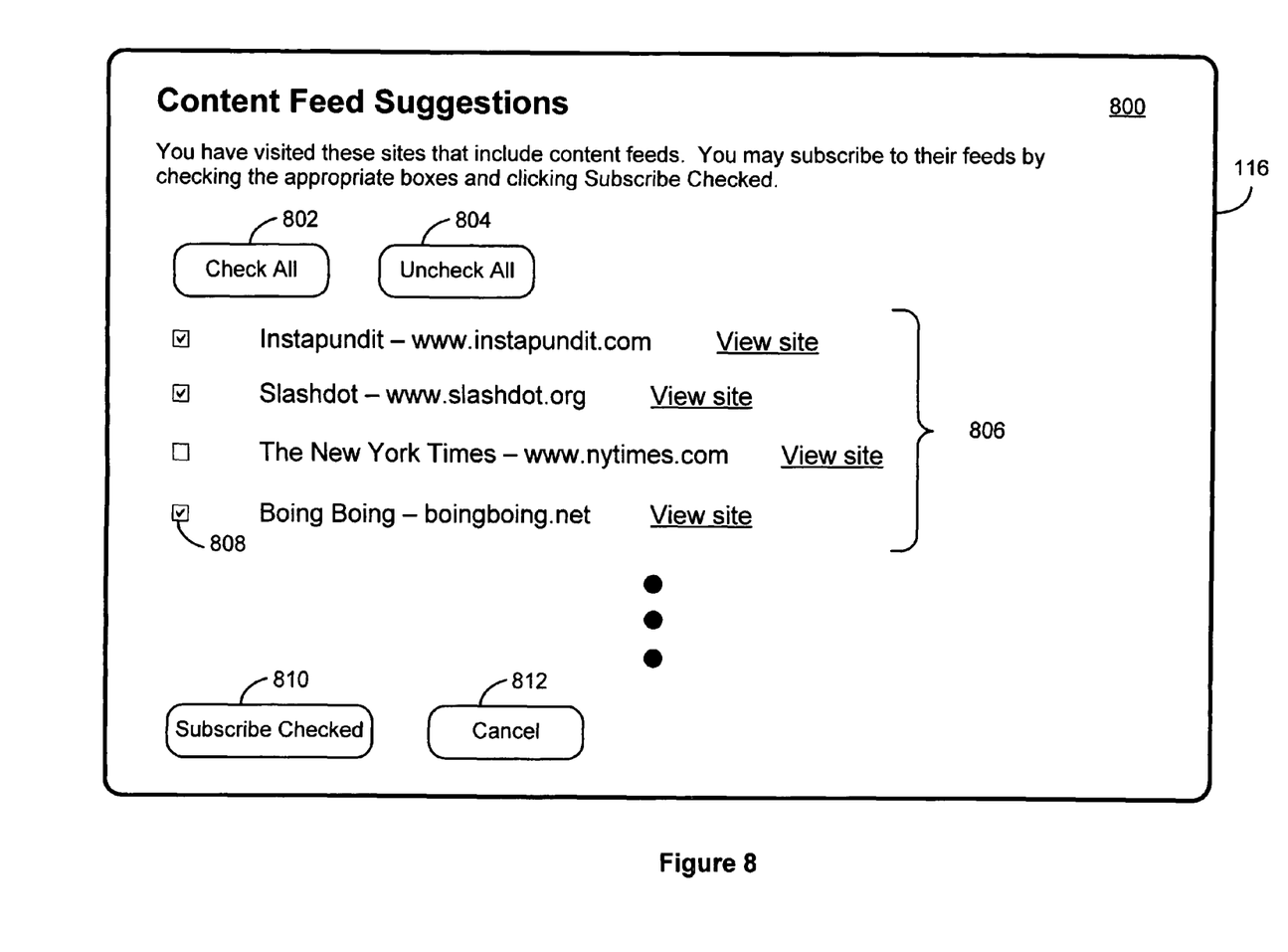
FIG. 8 is a diagram illustrating a content feeds subscription suggestions page in accordance with some embodiments.

From the UI 116, the user may request suggestions of content feeds to which she may subscribe. In some embodiments, the user may make the request by selecting a suggestions button 712. When the user selects the suggestions button 712, a suggestions page 800, as shown in FIG. 8, may be presented to the user. The suggestions page 800, which is a part of the UI 116, includes a list 806 of web pages visited by the user that have associated content feeds. The list 806 includes the subscription suggestions for the user. Each listed web page is a suggestion to the user to subscribe to the content feed associated with that web page. The suggestions page 800 may provide a link (labeled "View site" in FIG. 8) to each of the listed web pages 806 or some other manner of opening the listed web pages for viewing. The user may use the "View site" links to remind herself of the subject matter of the listed web pages. Each of the listed web pages 806 may have an associated checkbox 808, which the user may check or clear so as to identify the content feeds to which she wishes to subscribe (checked) and the content feeds to which she declines to subscribe (unchecked or cleared). Because the suggestions are opt-in operations, initially the checkboxes are not checked. The suggestions page 800 may also include optional "Check All" and "Clear All" buttons 802 and 804, respectively, for quick checking or clearing of all checkboxes 808 presented to the user in the suggestions page 800. The exemplary suggestions page 800 also includes a "Subscribe Checked" button 810. When the user selects the "Subscribe Checked" button 810, the UI 116 subscribes the user to the content feeds associated with the web pages with checked checkboxes and does not subscribe the user to the content feeds associated with the web pages with cleared checkboxes. This is accomplished by sending information (i.e., information identifying the checked and unchecked check boxes) from the suggestions page to a server that manages the user's feed content subscriptions. The suggestions page 800 may optionally include a "Cancel" button 812 which, when selected by the user, cancels out of the suggestions page 800 and declines all of the listed suggestions 806, even if one or more the suggestions has a checkbox that is checked.

It should be appreciated, however, that the suggestions page 800 is merely exemplary and only one of many possible ways of presenting content feed subscription suggestions to the user. The suggestions presentation mechanism may have more or less elements than shown and may take on alternative forms. Furthermore, the suggestions mechanism may be configured to present content feed subscription suggestions individually, one at a time (e.g., upon visiting a web site having an associated content feed) instead of in batches.

Figure 9A:
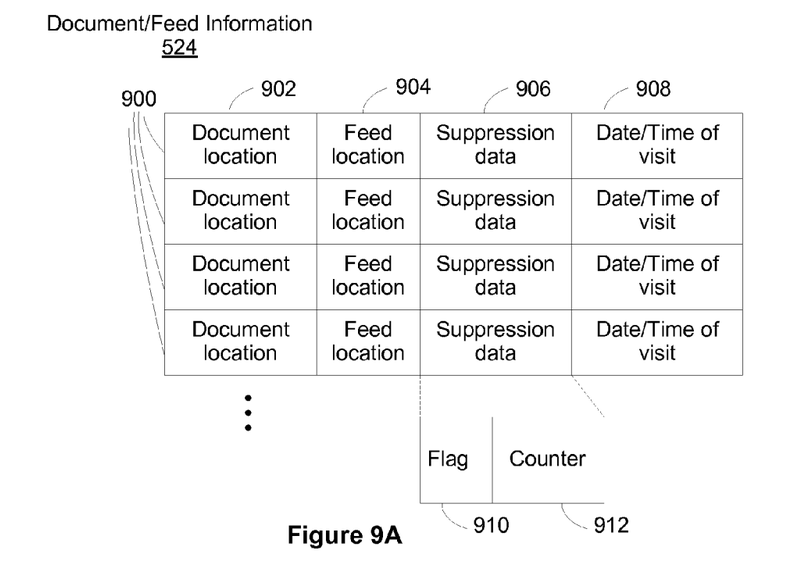
FIG. 9A is a diagram illustrating a data structure for maintaining records of identified documents that have associated content feeds, in accordance with some embodiments.

Attention is now directed to FIG. 9A, which is a diagram illustrating a data structure for maintaining records of identified documents that have associated content feeds, in accordance with some embodiments. In some embodiments, records of identified documents that have associated content feeds are maintained. By maintaining the records, not only can the content feed aggregation system present suggestions to a user more than one suggestion at a time, the system can also track which suggestions were rejected by the user and therefore suppress those suggestions in the future.

The document/feed information 524 (which, in some embodiments, is stored at the client computer 500) includes a plurality of document records 900. The records are maintained on a per-user basis. That is, each user has a respective set of records. The document location 902 provides the locator or address of the document and may be used as the identifier of the document. In some embodiments, the document location 902 is the URL of the document. The feed location 904 provides the locator or address of the content feed associated with the document. In some embodiments, the feed location 904 is the URL of the content feed. The date/time of visit 908 records the date/time of the most recent access to the document. In the case of documents that are web pages, the date/time of visit 908 records the date/time of the most recent visit to the web page.

The record 900 also may include suppression data 906. In some embodiments, the suppression data 906 includes a flag 910 and a counter 912. The flag 910 is an indicator of whether suggestions for the corresponding content feed should be suppressed due to prior rejections of suggestions to subscribe to the same content feed. Suggestions to subscribe to the content feed are suppressed if the flag 910 is set and are not suppressed if the flag 910 is cleared.

In embodiments where a suggestion suppression based on past rejections may expire, the suppression data 906 may include a counter 912 for measuring the duration of the suppression. The counter 912 may measure the duration since the flag 910 was set, in terms of some unit of time (e.g., number of days) or number of times the document has been accessed by the user (and identified by the system). The counter 912 is incremented for each unit of time (e.g., a day) elapsed or for each access of the document. When the counter reaches a predefined expiration threshold, the flag 910 may be cleared and the suggestion will be presented to the user. The counter 912 is reset and does not increment until the flag 910 is set again. Alternately, the counter 912 may be replaced by an expiration date and time, after which the suppression flag 910 is cleared or ignored.

In some other embodiments, the document/feed information may be stored at the server. In these embodiments the document/feed information from a plurality of users may be stored in one or more data structures. The document/feed information may include an additional field (such as a "UserID" field) to identify the user associated with each record 900

Figure 9B:
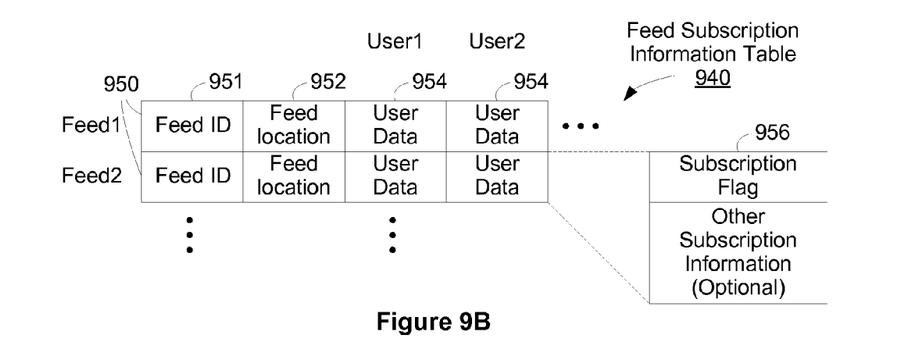
FIGS. 9B and 9C are diagrams of tables that store user data concerning feed sources (FIG. 9B) and specific feed items from those feed sources (FIG. 9C).
Figure 9C:
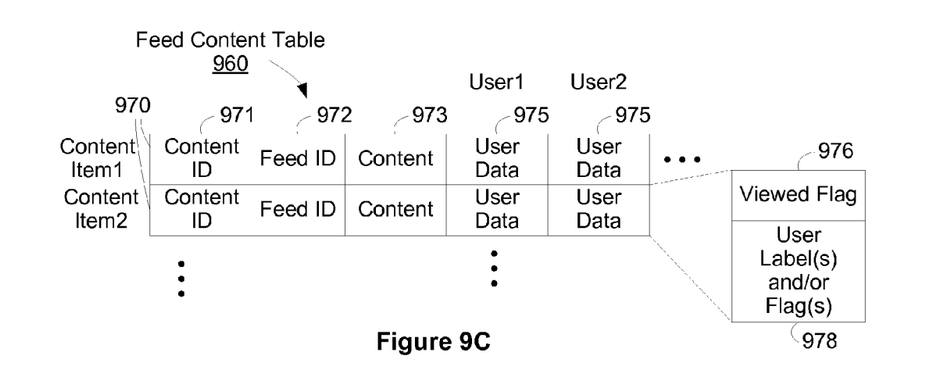

FIGS. 9B and 9C are diagrams of tables which may be stored by a server, or a set of servers, to store user data concerning feed sources (FIG. 9B) and specific feed items from those feed sources (FIG. 9C). A feed subscription information table 940 includes a row 950 for each feed source known to the system, and includes a column 954 for each registered user of the system. Each row 950 includes, for a particular feed source, an identifier 951 of the feed source, a location 952 (e.g., a URL) of the feed source, and user data 954 for each registered user. In some embodiments, the identifier 951 and location 952 may be merged, with the feed source location being its identifier 951. In some embodiments, each row 950 may include additional fields for storing additional information about the feed source, such as the URLs of web pages or blogs known to reference the feed source.

A feed content table 960 stores both content items from the feed sources known to the system and user data for those content items. The feed content table 960 includes a row 970 for each content item from each feed source. Each row includes one or more fields (971, 972) that identify the content item, such as a content ID 971 and a feed ID 972 (which identifies the feed source of the content item). In some embodiments, the content ID may include information that uniquely identifies the feed source, in which case the feed ID 972 may be omitted. Each row 970 may further include content 973 of the content item. The content 973 may include the metadata of the content item (e.g., title, description, URL, date/time, and possibly other metadata), and may further include the actual content of the content item. In some embodiments, the content 973 may include metadata and the actual content for multiple versions of the content item. In addition, each row 970 includes a column 975 or field for each registered user of the system. The user data in this column may include a viewed flag 976, which indicates whether the user corresponding to this column has viewed the content item associated with the row 970 containing the user data and may optionally include additional user information, such as one or more user specified labels or flags 978. A user may label content items that the user may want to view again in the future, and a record of the label that the user associated with a content item may be stored in the user data 975. In some embodiments, the system may allow users to label individual content items with predefined labels (e.g., star, red, blue, etc.), and some embodiments further allow users to label individual content items with user-defined labels.

The feed subscription information table 940 and feed content table 960, or portions of these tables, may be stored using sparse table storage mechanisms, since large portions of the user data in these tables may be empty or set to default values.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of providing content, comprising:
   at a server system:
      receiving a request for suggestions of content feeds to which a user may subscribe, the request submitted by the user at a client via a feed reader user interface; and
      responding to the request by:
         identifying a plurality of documents in accordance with a requirement that the identified plurality of documents are web pages previously visited by the user that have associated content feeds, the identified plurality of documents comprising at least a first document having an associated first content feed and a second document having an associated second content feed;
         providing to the user, for display in the feed reader user interface, suggestions to subscribe to at least a subset of the content feeds associated with the identified plurality of documents, including:
            conditionally, in accordance with a determination that the user has no present subscription to the first content feed, providing for display in the feed reader user interface a first suggestion to the user to subscribe to the first content feed; and otherwise
            conditionally, in accordance with a determination that the user has a present subscription to the first content feed, suppressing the provision of the first suggestion; and
            conditionally, in accordance with a determination that the user has rejected a past suggestion to subscribe to the second content feed, suppressing provision of a suggestion to the user to subscribe to the second content feed.

2. The method of claim 1, wherein suppressing the provision of the suggestion to the user to subscribe to the second content feed comprises suppressing the provision of the suggestion to the user to subscribe to the second content feed for at least a predefined duration.

3. The method of claim 1, wherein identifying a plurality of documents includes determining that the first content feed is associated with the first document by determining that the first document includes a locator of the first content feed.

4. A computer-implemented method of providing content, comprising:
   at a server system:
      receiving a request for suggestions of content feeds to which a user may subscribe, the request submitted by the user at a client via a feed reader user interface; and
      responding to the request by:
         identifying a plurality of documents in accordance with a requirement that the identified plurality of documents are web pages previously visited by the user that have associated content feeds, the plurality of documents including a first document having an associated first content feed and a second document having an associated second content feed;
         providing for display in the feed reader user interface suggestions to the user to subscribe to at least a subset of the content feeds associated with the identified plurality of documents;
         determining that the user has rejected a past suggestion to subscribe to the first content feed associated with the first document; and
         in accordance with the determining, suppressing provision of a suggestion to the user to subscribe to the first content feed.

5. A non-transitory computer readable storage medium storing one or more programs for execution by one or more processors in a server system, the one or more programs including instructions for:
   receiving a request for suggestions of content feeds to which a user may subscribe, the request submitted by the user at client via a feed reader user interface; and
   responding to the request by:
      identifying a plurality of documents in accordance with a requirement that the identified plurality of documents are web pages previously visited by the user that have associated content feeds, the identified plurality of documents comprising at least a first document having an associated first content feed and a second document having an associated second content feed;
      providing to the user, for display in the feed reader user interface, suggestions to subscribe to at least a subset of the content feeds associated with the identified plurality of documents, including:
         conditionally, in accordance with a determination that the user has no present subscription to the first content feed, providing for display in the feed reader user interface a first suggestion to the user to subscribe to the first content feed; and otherwise
         conditionally, in accordance with a determination that the user has a present subscription to the first content feed, suppressing the provision of the first suggestion;
         conditionally, in accordance with a determination that the user has rejected a past suggestion to subscribe to the second content feed, suppressing provision of a suggestion to the user to subscribe to the second content feed.

6. The computer readable storage medium of claim 5, wherein the instructions for suppressing the provision of the suggestion to the user to subscribe to the second content feed comprise instructions for suppressing the provision of the suggestion to the user to subscribe to the second content feed for at least a predefined duration.

7. The computer readable storage medium of claim 5, wherein the instructions for identifying a plurality of documents includes instructions for determining that the first content feed is associated with the first document by determining that the first document includes a locator of the first content feed.

8. A non-transitory computer readable storage medium storing one or more programs for execution by one or more processors in a server system, the one or more programs including instructions for:
  receiving a request for suggestions of content feeds to which a user may subscribe, the request submitted by the user at a client via a feed reader user interface; and
  responding to the request by:
    identifying a plurality of documents in accordance with a requirement that the identified plurality of documents are web pages previously visited by the user that have associated content feeds, the plurality of documents including a first document having an associated first content feed and a second document having an associated second content feed;
    providing for display in the feed reader user interface suggestions to the user to subscribe to at least a subset of the content feeds associated with the identified plurality of documents;
    determining that the user has rejected a past suggestion to subscribe to the first content feed associated with the first document; and
    in accordance with the determining, suppressing provision of a suggestion to the user to subscribe to the first content feed.

9. The method of claim 2, wherein the predefined duration is determined by a period of time elapsed since the start of the suppression.

10. The method of claim 2, wherein the predefined duration is determined by a number of times a document with the same content feed is accessed and identified.

11. The computer readable storage medium of claim 6, wherein the predefined duration is determined by a period of time elapsed since the start of the suppression.

12. The computer readable storage medium of claim 6, wherein the predefined duration is determined by a number of times a document with the same content feed is accessed and identified.

13. The method of claim 4, wherein identifying a plurality of documents includes determining that the first content feed is associated with the first document by determining that the first document includes a locator of the first content feed.

14. The method of claim 4, wherein suppressing the provision of the suggestion to the user to subscribe to the first content feed comprises suppressing the provision of the suggestion to the user to subscribe to the first content feed for at least a predefined duration.

15. The method of claim 14, wherein the predefined duration is determined by a period of time elapsed since the start of the suppression.

16. The method of claim 14, wherein the predefined duration is determined by a number of times a document with the same content feed is accessed and identified.

17. The non-transitory computer readable storage medium of claim 8, wherein the instructions for wherein identifying a plurality of documents include instructions for determining that the first content feed is associated with the first document by determining that the first document includes a locator of the first content feed.

18. The non-transitory computer readable storage medium of claim 8, wherein the instructions for suppressing the provision of the suggestion to the user to subscribe to the first content feed comprise instructions for suppressing the provision of the suggestion to the user to subscribe to the first content feed for at least a predefined duration.

19. The non-transitory computer readable storage medium of claim 18, wherein the predefined duration is determined by a period of time elapsed since the start of the suppression.

20. The non-transitory computer readable storage medium of claim 18, wherein the predefined duration is determined by a number of times a document with the same content feed is accessed and identified.

21. A server system for providing content, comprising:
  one or more processors; and
  memory storing one or more programs to be executed by the one or more processors;
  the one or more programs comprising instructions for:
    receiving a request for suggestions of content feeds to which a user may subscribe, the request submitted by the user at a client via a feed reader user interface; and
    responding to the request by:
      identifying a plurality of documents in accordance with a requirement that the identified plurality of documents are web pages previously visited by the user that have associated content feeds, the identified plurality of documents comprising at least a first document having an associated first content feed and a second document having an associated second content feed;
      providing to the user, for display in the feed reader user interface, suggestions to subscribe to at least a subset of the content feeds associated with the identified plurality of documents, including:
      conditionally, in accordance with a determination that the user has no present subscription to the first content feed, providing for display in the feed reader user interface a first suggestion to the user to subscribe to the first content feed; and otherwise
      conditionally, in accordance with a determination that the user has a present subscription to the first content feed, suppressing the provision of the first suggestion; and
      conditionally, in accordance with a determination that the user has rejected a past suggestion to subscribe to the second content feed, suppressing provision of a suggestion to the user to subscribe to the second content feed.

22. The system of claim 21, wherein identifying a plurality of documents includes determining that the first content feed is associated with the first document by determining that the first document includes a locator of the first content feed.

23. The system of claim 21, wherein suppressing the provision of the suggestion to the user to subscribe to the second content feed comprises suppressing the provision of the suggestion to the user to subscribe to the second content feed for at least a predefined duration.

24. The system of claim 23, wherein the predefined duration is determined by a period of time elapsed since the start of the suppression.

25. The system of claim 23, wherein the predefined duration is determined by a number of times a document with the same content feed is accessed and identified.

26. A server system for providing content feed suggestion, comprising:
- one or more processors; and
- memory storing one or more programs to be executed by the one or more processors;
- the one or more programs comprising instructions for:
    - receiving a request for suggestions of content feeds to which a user may subscribe, the request submitted by the user at a client via a feed reader user interface; and
    - responding to the request by:
        - identifying a plurality of documents in accordance with a requirement that the identified plurality of documents are web pages previously visited by the user that have associated content feeds, the plurality of documents including a first document having an associated first content feed and a second document having an associated second content feed;
        - providing for display in the feed reader user interface suggestions to the user to subscribe to at least a subset of the content feeds associated with the identified plurality of documents;
        - determining that the user has rejected a past suggestion to subscribe to the first content feed associated with the first document; and
        - in accordance with the determining, suppressing provision of a suggestion to the user to subscribe to the first content feed.

27. The system of claim 26, wherein identifying a plurality of documents includes determining that the first content feed is associated with the first document by determining that the first document includes a locator of the first content feed.

28. The system of claim 26, wherein suppressing the provision of the suggestion to the user to subscribe to the first content feed comprises suppressing the provision of the suggestion to the user to subscribe to the first content feed for at least a predefined duration.

29. The system of claim 28, wherein the predefined duration is determined by a period of time elapsed since the start of the suppression.

30. The system of claim 28, wherein the predefined duration is determined by a number of times a document with the same content feed is accessed and identified.

* * * * *